United States Patent [19]

Hildebrand

[11] Patent Number: 5,063,262

[45] Date of Patent: Nov. 5, 1991

[54] POLYMERIC COSTABILIZERS FOR MOLDING COMPOSITIONS BASED ON POLYMERS OF VINYL CHLORIDE

[75] Inventor: Thomas Hildebrand, Dortmund, Fed. Rep. of Germany

[73] Assignee: Huels Aktiengesellschaft, Marl, Fed. Rep. of Germany

[21] Appl. No.: 588,938

[22] Filed: Sep. 26, 1990

[30] Foreign Application Priority Data

Sep. 26, 1989 [DE] Fed. Rep. of Germany ....... 3932041

[51] Int. Cl.$^5$ .............................................. C08K 5/35
[52] U.S. Cl. ..................................... 524/97; 524/382; 524/399; 524/502; 524/514
[58] Field of Search ............... 524/382, 399, 502, 514, 524/97

[56] References Cited

U.S. PATENT DOCUMENTS

4,755,549 7/1988 Kemper et al. ..................... 524/226

Primary Examiner—Paul R. Michl
Assistant Examiner—Yong S. Lee
Attorney, Agent, or Firm—Oblon, Spivak, McClelland, Maier & Neustadt

[57] ABSTRACT

Costabilizers which are copolymers of oxazolines and bisoxazolines enhance the stabilizing properties of primary stabilizers such as polyoxazolines and zinc compounds in chloride-containing thermoplastic molding compositions, preferably based on polymers of vinyl chloride.

6 Claims, 6 Drawing Sheets

POLYMERIC COSTABILIZERS FOR MOLDING COMPOSITIONS BASED ON POLYMERS OF VINYL CHLORIDE

BACKGROUND OF THE INVENTION

1. Field of the Invention
relates to rigid or plasticized,

The present invention stabilized thermoplastic molding compositions based on halogen-containing polymers, in particular polyvinyl chloride or polymers essentially containing vinyl chloride, and costabilizers for preparing such compositions.

2. Discussion of the Background

It is known that chloride-containing polymers are readily degraded by the action of heat, for example, during processing. This degradation leads to undesired discolorations and to an impairment of the mechanical properties. Consequently, this degradation is avoided by adding stabilizers to the polymers before processing. In the case of polyvinyl chloride and copolymers containing essentially vinyl chloride, particular use is made of organotin compounds, inorganic and organic lead salts, organic antimony compounds or combinations of cadmium carboxylates and barium carboxylates and also of a mixture of zinc soaps and polyoxazolines. These so-called primary stabilizers are frequently supplemented with costabilizers to improve their effectiveness. The modes of action of primary or co-stabilizers and their combined action (synergism) are described in the relevant literature, for example in the publication by L. I. Nass, "Heat Stabilizers", *Kirk-Othmer Encyclopedia of Chemical Technology*, volume 12, 3rd edition, page 225, published by John Wiley and Sons, 1980.

Essentially, these are costabilizers which improve the initial color and the ultimate stability of the chlorine-containing polymer. For instance, epoxy compounds, polyols, organic phosphites, substituted dihydropyridines, 1,3-diketones or combinations of these compounds are used.

At the present time, there are no highly effective costabilizers for primary stabilizers based on polymers. Therefore, there remains a need for substances or mixtures of substances which enhance or reinforce the heat-stabilizing action of polymeric primary stabilizers.

SUMMARY OF THE INVENTION

Accordingly, one object of this invention is to provide costabilizers which enhance the heat-stabilizing action of stabilizers.

It is another object to provide costabilizers which enhance the heat-stabilizing action of primary polymeric stabilizers.

It is another object to provide costabilizers which enhance the heat-stabilizing action of stabilizers used to stabilize halogen-containing polymers.

It is another object to provide novel stabilizer mixtures which stabilize halogen-containing polymers to the action of heat.

It is another object to provide novel stabilized thermoplastic molding compositions which contain a costabilizer which enhances the heat-stabilizing action of stabilizers.

It is another object to provide novel stabilized thermoplastic molding compositions which contain a costabilizer which enhances the heat-stabilizing action of primary polymeric stabilizers.

It is another object to provide novel stabilized thermoplastic molding compositions based on halogen-containing polymers which contain a stabilizer and a costabilizer which enhances the heat-stabilizing action of the stabilizer.

These and other objects, which will become apparent during the following detailed description, have been achieved by the discovery that costabilizers of formula I based on copolymers of $$\left[\begin{array}{c}O\\ \diagup\!\!\!-R^1\\ N\end{array}\right] \text{ and } \left[\begin{array}{cc}O & O\\ \diagup\!\!\!-X\!\!-\!\!\diagdown\\ N & N\end{array}\right]$$

(Ia)       (Ib)

greatly improve the stabilizing effect of primary stabilizers.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Thus, one aspect of the present invention relates to costabilizers I based on copolymers of (Ia)    (Ib)

The compounds of formula I may be synthesized from the compounds of the formulae Ia and Ib in which R¹ is a straight-chain or branched alkyl group having from 1 to 20 carbon atoms, including, e.g , methyl, ethyl, propyl, isopropyl, butyl, isobutyl, pentyl, isopentyl, hexyl, isohexyl, heptyl, isoheptyl, octyl, isooctyl, nonyl, isononyl, decyl, isodecyl, dodecyl, isododecyl, tridecyl, tetradecyl, hexadecyl, octadecyl or arachinyl or is cyclic or alkyl-substituted cycloalkyl group, including, e.g., cyclopentyl, hexyl, heptyl, octyl, nonyl, decyl, dodecyl, tridecyl, tetradecyl, hexadecyl, octadecyl or arachinyl.

Furthermore, R¹ may also be an alkenyl group having from 3 to 18 carbon atoms, including, e.g., propenyl, butenyl, pentenyl, hexenyl, heptenyl, octenyl, nonenyl, decenyl, dodecenyl, tetradecenyl, hexadecenyl or octadecenyl.

Moreover, R¹ may also represent an alkyl-, halogen-, or hydroxyl-substituted or unsubstituted aryl such as, for example, phenyl, o-tolyl, m-tolyl, p-tolyl, p-tert-butylphenyl, p-nonylphenyl, p-dodecylphenyl, o-hydroxyphenyl, m-hydroxyphenyl, p-hydroxyphenyl, o-chlorophenyl, m-chlorophenyl or p-chlorophenyl.

R¹ may also be a straight chain or branched alkoxy group having from 1 to 20 carbon atoms, including, e.g., methoxy, ethoxy, propoxy, isopropoxy, butoxy, isobutoxy, pentyloxy, isopentyloxy, hexyloxy, isohexyloxy, heptyloxy, isoheptyloxy, octyloxy, isooctyloxy, nonyloxy, isononyloxy, decyloxy, isodecyloxy, dodecyloxy, isododecyloxy, tridecyloxy, tetradecyloxy, hexadecyloxy, octadecyloxy or arachinyloxy; or cyano; or a straight chain or branched acyl group having from 1 to 20 carbon atoms, including, e.g., methyl-, ethyl-, propyl-, isopropyl-, butyl-, isobutyl-, pentyl-, isopentyl-, hexyl-, isohexyl-, heptyl-, isoheptyl-, octyl-, isooctyl-, nonyl-, isononyl-, decyl-, isodecyl-, dodecyl-, isododecyl-, tridecyl-, tetradecyl-, hexadecyl-, octadecyl- or arachinyl-carbonyl.

X may be a straight chain or branched alkylene group having from 1 to 20 carbon atoms, including, e.g., methylene, ethylene, propylene, isopropylene, butylene, isobutylene, pentylene, isopentylene, hexylene, isohexylene, heptylene, isoheptylene, octylene, isooctylene, nonylene, isononylene, decylene, isodecylene, dodecylene, isododecylene, tridecylene, tetradecylene, hexadecylene, octadecylene or arachinylene or a cyclic or alkyl-substituted cycloalkylene group having 5 to 10 carbon atoms, including, e.g., cyclopentylene, cyclohexylene, cycloheptylene, cyclooctylene, cyclononylene, or cyclodecylene.

Moreover, X may also be an alkenylene group having from 3 to 18 carbon atoms, including, e.g., ethenylene, propenylene, butenylene, pentenylene, hexenylene, heptenylene, octenylene, nonenylene, decenylene, dodecenylene, tetradecenylene, hexadecenylene or octadecenylene.

Furthermore, X may also represent an alkyl-, halogen-, cyano, or hydroxyl-substituted or unsubstituted arylene such as, for example, phenylene, o-tolylene, o-nonylphenylene, o-dodecylphenylene, o-hydroxyphenylene, o-chlorophenylene and o-cyanophenylene.

X may also be a straight chain or branched alkyleneoxy group having from 1 to 20 carbon atoms, including, e.g., methyleneoxy, ethyleneoxy, propyleneoxy, isopropyleneoxy, butyleneoxy, isobutyleneoxy, pentyleneoxy, isopentyleneoxy, hexyleneoxy, isohexyleneoxy, heptyleneoxy, isoheptyleneoxy, octyleneoxy, isooctyleneoxy, nonyleneoxy, isononyleneoxy, decyleneoxy, isodecyleneoxy, dodecyleneoxy, isododecyleneoxy, tridecyleneoxy, tetradecyleneoxy, hexadecyleneoxy, octadecyleneoxy or arachinyleneoxy.

X may also be a straight chain or branched alkylenecarbonyl group, including, e.g., ethylene-, propylene-, isopropylene-, butylene-, isobutylene-, pentylene-, isopentylene-, hexylene-, isohexylene-, heptylene-, isoheptylene-, octylene-, isooctylene-, nonylene-, isononylene-, decylene-, isodecylene-, dodecylene-, isododecylene-, tridecylene-, tetradecylene-, hexadecylene-, octadecylene- or arachinylene-carbonyl.

Preference is given to the use of compounds of the formulae Ia and Ib in which R¹ is methyl, ethyl or propyl and X is ethylene, trimethylene, tetramethylene or phenylene.

The preparation of the costabilizers I may be carried out by reacting the compounds Ia and Ib in a mole ratio of from 90:10 to 99:1, preferably from 94:6 to 99:1, especially preferably in a ratio of Ia:Ib greater than about 95:5, in particular in about 97.5:2.5 mol%, in ethylbenzene (containing about 95 ppm of water) with catalytic amounts (0.5 to 1.5 mol%, in particular about 0.9 mol%) of methyl 4-toluenesulphonate for a reaction time of about 12 to 15 minutes at 133° C. and a post-polymerization time of 60 minutes at 133° C. This gives a crosslinked copolymer (I) in yields >95%.

In addition to the costabilizer I, the present invention relates to stabilizer systems which contain the present costabilizer and primary stabilizers based on a zinc compound and polyoxazolines. The zinc compound is characterized in that it contains one or more compounds of zinc of the formula

$R^2O—Zn—OR^3$    (II)

in which $R^2$ and $R^3$ may be identical or different and represent straight-chain or branched, optionally hydroxyl-substituted aliphatic acyl groups having from 8 to 36 carbon atoms or aryl groups which are optionally substituted by alkyl groups having from 1 to 22 carbon atoms. The $C_8$–$C_{21}$ carboxylic acids are, for example, benzoic acid, p-tert-butylbenzoic acid or aliphatic carboxylic acids, in particular octanoic acid, dodecanoic acid, stearic acid or oleic acid.

Preferred examples of zinc compounds are zinc soaps of fatty acids having from 8 to 36, preferably from 8 to 22 carbon atoms. Suitable examples of these are in particular caprylates, caprates, laurates, myristates, palmitates, stearates and behenates. It is also possible to use the salts of branched fatty acids such as 2-ethylhexanoic acid, 2-octyldecanoic acid or tetradecyloctadecanoic acid or hydroxy-fatty acids such as 9(10)-hydroxystearic acid or 9,10-dihydroxystearic acid. The zinc soaps may be composed of the salts of individual fatty acids or from fatty acid mixtures such as are obtained from natural fats. Suitable salts of aromatic carboxylic acids are in particular the zinc salts of benzoic acid and of substituted benzoic esters, in particular of alkyl-substituted benzoic acid. Suitable phenolates are: methyl-phenolates, tert-butylphenolates, nonylphenolates, dodecylphenolates or naphthenates of zinc.

The polyoxazolines used as primary stabilizers are represented by the following formula:

(III)

in which $R^4$ are optionally different, straight-chain or branched alkyl radicals having from 1 to 22 carbon atoms or substituted or unsubstituted cycloalkyl or aryl radicals, preferably alkyl radicals having from 1 to 12 carbon atoms, while n represents integers from 10 to 10,000 (see, e.g.. DE-C-0,253,985). Examples of compounds of the formula III are polymethyloxazoline, polyethyloxazoline, poly-n-propyloxazoline, polyisopropyloxazoline, polyundecyloxazoline and polyphenyloxazoline. Other primary stabilizers which can be used are copolymers of two different alkyl- or aryloxazolines each being present in a proportion of between 5% and 95%. It is also possible to use terpolymers of three different oxazolines, each being present in a proportion of from 5 to 95%.

Other highly suitable materials are those stabilized molding compositions which, in addition to the above-mentioned primary stabilizers (II) and (III), contain compounds of tin, lead or antimony or combinations of compounds of cadmium, barium, calcium and zinc.

The stabilizer mixtures according to the present invention may be used for stabilizing chlorine-containing polymers. These are preferably vinyl chloride homopolymers or vinyl chloride copolymers. Preference is furthermore given to suspension polymers and mass polymers and also to emulsion polymers. Suitable comonomers for the copolymers are for example: vinyl acetate, vinylidene chloride, trans-dichloroethene, ethylene, propylene, butylene, maleic acid, acrylic acid, fumaric acid and itaconic acid. Other suitable chlorine-containing polymers are post-chlorinated PVC and chlorinated polyolefins, and also graft copolymers of PVC with ethylene-vinyl acetate (EVA), acrylonitrile-butadienestyrene (ABS) and methacrylate-butadienestyrene (MBS).

The stabilized molding compositions suitably contain the primary stabilizers of the formula II and III in amounts of from 0.02 to 2.0 percent by weight, in particular of from 0.05 to 1.0 percent by weight of each, based on the weight of the chlorine-containing polymer.

The costabilizer according to the invention of the formula I is advantageously used in amounts of from 0.001 to 2.0, preferably in amounts of from 0.01 to 0.05 percent by weight, based on the weight of the chlorine-containing polymer.

The stabilized molding compositions according to the invention may additionally contain commercially available costabilizers. These are, for example, epoxy compounds, preferably epoxidized fatty acids such as epoxidized soya bean oil, phosphites, in particular mixed aryl-alkyl phosphites, and phenolic antioxidants, which are preferably incorporated in amounts of from 0.05 to 5.0, in particular from 0.1 to 3.0 percent by weight, based on the weight of the chlorine-containing polymer.

Suitable conventional phosphites are phosphites of the general formula IV and V (IV)  (V)

in which $R^5$, $R^6$ and $R^7$ are identical or different and denote $C_6$–$C_{18}$-alkyl, a phenyl radical which may be unsubstituted or substituted by $C_1$–$C_9$-alkyl or $C_1$–$C_9$-alkoxy, or denote $C_5$–$C_7$-cycloalkyl, and in which $R^8$ is $C_5$–$C_{18}$-alkyl.

If $R^5$, $R^6$, $R^7$ and $R^8$ denote $C_6$–$C_{18}$alkyl, this is, for example, n-hexyl, n-octyl, n-nonyl, decyl, dodecyl, tetradecyl, hexadecyl or octadecyl. Preference is given to alkyl groups having from 8 to 12 carbon atoms.

$R^5$, $R^6$ and $R^7$, as substituted phenyl, are for example tolyl, ethylphenyl, xylyl, nonylphenyl, cumyl, cresyl, 4-methoxyphenyl, 2,4-dimethoxyphenyl, ethoxyphenyl, butoxyphenyl, p-n-octylphenyl or p-n-nonylphenyl.

Most particularly, suitable phosphites are trioctyl, tridecyl, tridodecyl, tritetradecyl, tristearyl, trioleyl, triphenyl, tricresyl, tris-p-nonylphenyl and tricyclohexyl phosphite, and particular preference is given to the aryl dialkyl phosphites and also to the alkyl diaryl phosphites such as for example, phenyl didecyl phosphite, nonylphenyl didecyl phosphite, (2,4-di-tert-butylphenyl) didodecyl phosphite and (2,6-di-tert-butylphenyl) didodecyl phosphite.

Examples of antioxidants are alkylated monophenols and hydroquinones, hydroxylated thiodiphenyl ethers, 1,4-alkylidene-bis-phenols, benzyl compounds, acylaminophenols, esters or amides of $\beta$-(3,5-di-tert-butyl-4-hydroxyphenyl)propionic acid and esters of $\beta$-(5-tertbutyl-4-hydroxy-3-methylphenyl)propionic acid.

Preferred antioxidants are alkylated monophenols, alkylidene-bisphenols and phenyl-substituted propionic esters, in particular, 2,6-di-tert-butyl-p-cresol, 2,2-bis(4'-hydroxyphenyl)propane and n-octadecyl $\beta$-(3,5-ditert-butyl-4-hydroxyphenyl)propionate.

The compound of the formula I can also be used with other nitrogen-containing organic stabilizers. Examples of these are cyanamide, dicyandiamide, guanamines such as benzoguanamine, indoles such as phenylindole, pyrazoles (for example as described in GB-B-866,936), ureas and thioureas such as monophenylurea and diphenylthiourea, and aminocrotonic esters; also, $\beta$-diketones such as stearylbenzoylmethane, and polyols such as pentaerythritol.

It is observed, with the stabilized molding compositions according to the present invention based on polymers of vinyl chloride which contain a compound of the formula I as costabilizer, that the presence of compound I reinforces the stabilizing action of a primary stabilizer mixture of zinc compounds and polymers from the group of polyoxazolines to an extent which could not have been foreseen. The positive effect of the present costabilizer is seen as an improvement in the initial color and in a prolongation of the ultimate stability.

It is possible to prepare the stabilized molding compositions according to the invention by conventional methods, for example, by simple mechanical mixing of the components in conventional mixers. This mixing operation may be used to incorporate other conventional processing auxiliaries such as for example lubricants (montan waxes or polyol partial esters), plasticizers, fillers, light stabilizers, pigments or other costabilizers such as, for example, epoxidized fatty acid esters.

It is possible to achieve a homogeneous distribution of the stabilizers in PVC, for example with the aid of a two-roll mill at 150° to 200° C.

Other features of the invention will become apparent in the course of the following descriptions of exemplary embodiments, which are given for illustration of the invention and are not intended to be limiting thereof.

EXAMPLES

Preparation and testing of milled sheet

The action of various stabilizer combinations was tested by determining the static heat stability of a milled sheet. For this purpose, the stabilizer combinations and optionally plasticizers and processing auxiliaries were mixed with polyvinyl chloride for 30 seconds in a laboratory mill and then processed on a two-roll mill at a roll temperature of 170° C., with co-rotation, over the course of 5 minutes to form 1 mm thick milled sheets. Strips of dimensions 14×250 mm were cut from the milled sheets, and these strips were then subjected to heat stress in a special oven (Metrastat, type Sigma) at 180° C. Under the test conditions, the test strips were continuously discharged from the heating zone, and the effect of the stabilizers on the color variation was determined.

The color variations were assessed objectively, and the test strips were compared with each other by determining the yellowness indices (YI; ASTM Method E 313-73) using a colorimeter (LabScan 5100 plus) from Dr. Slevogt & Co. and plotting the yellowness indices against the duration of heat stress. High YI values indicate strong discoloration and thus low stability.

The following stabilizers were used:
Zn=Zinc stearate
Ba=Barium stearate
PX=Polyethyloxazoline
PC=Copolymer of methyl- and isopropyl-oxazoline
TMP=Trimethylolpropane
Cop=Copolymer of ethyloxazoline and tetramethylene-bis-oxazoline (molar ratio 87,5:2,5)
The formulations were prepared from the following constituents (parts=parts by weight):

Formulation A 100 parts of suspension-polyvinyl chloride (K-value 70; VESTOLIT S 7054; Hüls AG, Marl, West Germany)
30 parts of dioctyl phthalate (VESTINOL AH; Hüls AG, Marl, West Germany)
0.3 part of montan wax

Formulation B 100 parts of suspension-polyvinyl chloride (K-value 70; VESTOLIT S 7054; Hüls AG, Marl, West Germany)
300 parts of dioctyl phthalate (VESTINOL AH; Hüls AG, Marl, West Germany)
0.3 part of zinc stearate
0.6 part of barium stearate

Formulation C 100 parts of suspension-polyvinyl chloride (K-value 70; VESTOLIT S 7054; Hüls AG, Marl, West Germany)
1.0 part of stearic acid

Formulation D 100 parts of suspension-polyvinyl chloride (K-value 60; VESTOLIT S 6058; Hüls AG, Marl, West Germany)
1.0 part of stearic acid

Formulation E 100 parts of mass-polyvinyl chloride (K-value 58; VESTOLIT M 5867; Hüls AG, Marl, West Germany)
5.0 parts of epoxidized soya bean oil (Reoplast 39, Ciba-Geigy AG, Bensheim, West Germany)

The polyvinyl chloride molding compositions to be tested were prepared by adding one of the stabilizers given in Table 2 to one of the formulations A to E, and these mixtures were processed in the manner described above to form test strips. The results of these tests are summarized in Table 1, and the detailed results for a number of various combinations of chlorine-containing polymer formulation and stabilizer mixture are presented in Examples 1-10 and FIGS. 1 and 12.

TABLE 1.

Comparison of the results of the heat test, with and without costabilizer.

| stabilizer composition: | Zinc stearate | (Zn) |
| | Polyethyloxazoline | (PX) |
| | Copolymer of methyloxazoline and isopropyloxazoline | (PC) |
| | Trimethylolopropane | (TMP) |
| and costabilizer: | Copolymer of ethyloxazoline and tetramethylene-bis-oxazoline | (Cop) |

| | Zn/PX/Cop | | Zn/PC/Cop | |
| --- | --- | --- | --- | --- |
| Formulation | without TMP | with TMP | without TMP | with TMP |
| S 7054 Stearic acid | better | inferior | better | inferior |
| S 7054 VESTINOL AH Zn stearate Ba stearate | equal or better | equal or better | better | |
| S 7054 VESTINOL AH Montan wax (corr. to Wax E) | inferior | | equal | better |
| S 6058 Stearic acid | better | equal | better | |
| M 5867 Reoplast 39 | inferior | better | inferior | better |

TABLE 2.

Constituents of the stabilizer compositions in parts by weight

| Stabilizer mixtures | Zn | PX | PC | TMP | Cop |
| --- | --- | --- | --- | --- | --- |
| Zn/PX | 0.2 | 0.2 | | | |
| Zn/PC | 0.2 | | 0.2 | | |
| Zn/PX/TMP | 0.2 | 0.2 | | 0.5 | |
| Zn/PC/TMP | 0.2 | | 0.2 | 0.5 | |
| Zn/PX/Cop | 0.2 | 0.2 | | | 0.03 |
| Zn/PC/Cop | 0.2 | | 0.2 | | 0.03 |
| Zn/PX/TMP/Cop | 0.2 | 0.2 | | 0.5 | 0.03 |
| Zn/PC/TMP/Cop | 0.2 | | 0.2 | 0.5 | 0.03 |

EXAMPLE 1

Formulation 100 parts by wt. of VESTOLIT S 7054
1.0 part by wt. of stearic acid

|  | YI after heat stress (min) | | | | | |
|---|---|---|---|---|---|---|
| Stabilizers | 10 | 15 | 20 | 25 | 30 | 35 |
| Zn/PX | 22 | 25 | 29 | 34 | 37 | 61 |
| Zn/PX/TMP | 12 | 14 | 17 | 23 | 30 | 36 |
| Zn/PX/Cop | 18 | 21 | 25 | 31 | 37 | 39 |
| Zn/PX/TMP/Cop | 16 | 17 | 19 | 24 | 30 | 36 |

Figure 1:
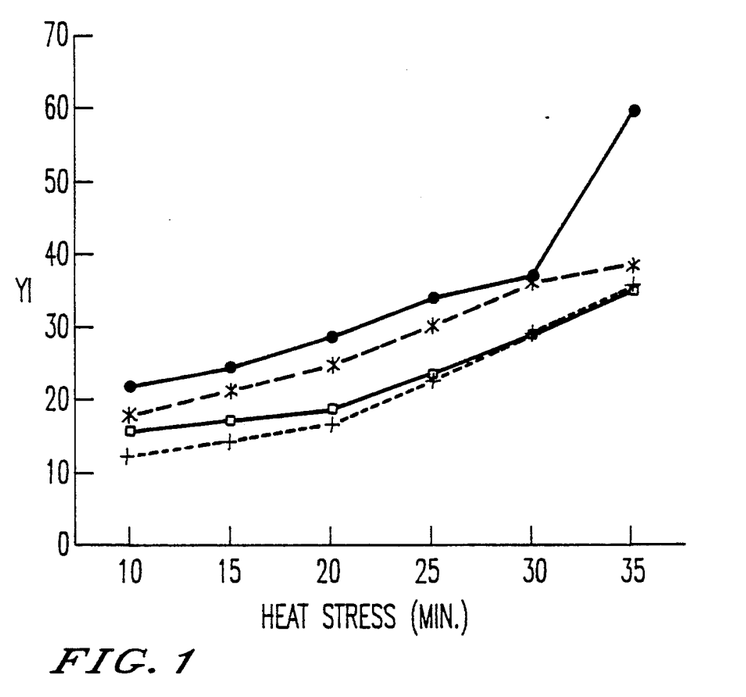
FIGS. 1, 7, 10 and 11 graphically illustrate the heat-stabilizing effect of various stabilizers in various thermoplastic molding compositions by plotting the Yellowness Index (YI) as a function of the time of heat stress, for the stabilizers: Zn/PX (·), Zn/PX/TMP (+), Zn/PX/Cop (*) and Zn/PX/TMP/Cop (□)

These results are presented graphically in FIG. 1.

EXAMPLE 2

Formulation 100 parts by wt. of VESTOLIT S 7054
1.0 part by wt. of stearic acid

|  | YI after heat stress (min) | | | | | | |
|---|---|---|---|---|---|---|---|
| Stabilizers | 10 | 15 | 20 | 25 | 30 | 35 | 40 |
| Zn/PC | 23 | 25 | 28 | 31 | 35 | — | — |
| Zn/PC/TMP | 13 | 15 | 17 | 21 | 27 | 31 | 33 |
| Zn/PC/Cop | 21 | 24 | 26 | 31 | 37 | 41 | — |
| Zn/PC/TMP/Cop | 14 | 16 | 19 | 24 | 32 | 36 | — |

Figure 2:
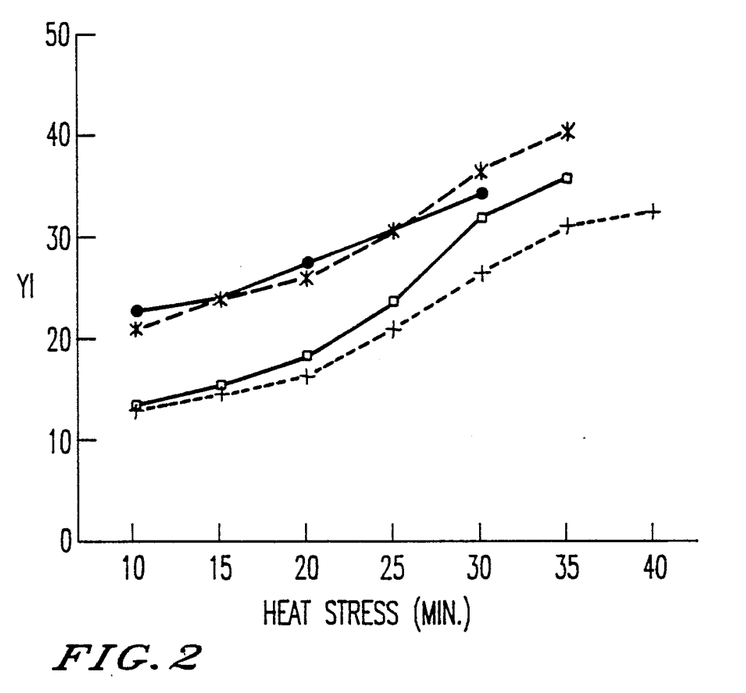
FIGS. 2, 8, 9 and 12 graphically illustrate the heat-stabilizing effect of various stabilizers in various thermoplastic molding compositions by plotting the Yellowness Index (YI) as a function of the time of heat stress, for the stabilizers: Zn/PC (·), Zn/PC/TMP (+), Zn/PC/Cop (*) and Zn/PC/TMP/Cop (□)

These results are presented graphically in FIG. 2.

EXAMPLE 3

Formulation 100 parts by wt. of VESTOLIT S 7054
30 parts by wt. of VESTINOL AH
0.3 part by wt. of zinc stearate
0.6 part by wt. of barium stearate

|  | YI after heat stress (min) | | | | | | | | | |
|---|---|---|---|---|---|---|---|---|---|---|
| Stabilizers | 10 | 15 | 20 | 25 | 30 | 35 | 40 | 45 | 50 | 55 |
| Zn/PC | 12 | 12 | 15 | 20 | 17 | 14 | 15 | 25 | — | — |
| Zn/PC/TMP | 8 | 9 | 9 | 12 | 16 | 16 | 13 | 14 | 33 | — |
| Zn/PC/Cop | 11 | 11 | 12 | 14 | 12 | 12 | 12 | 18 | — | — |
| Zn/PC/TMP/Cop | 7 | 7 | 8 | 10 | 14 | 15 | 11 | 10 | 19 | 38 |

Figure 3:
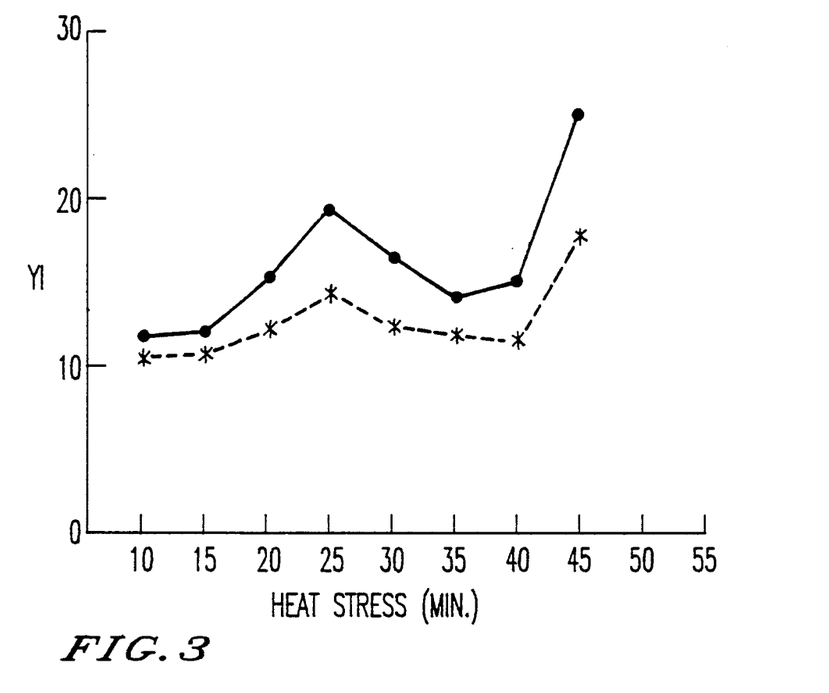
FIG. 3 graphically illustrates the heat-stabilizing effect of various stabilizers in a thermoplastic molding composition by plotting the Yellowness Index (YI) as a function of the time of heat stress, for the stabilizers Zn/PC (·) and Zn/PC/Cop (*)
Figure 4:
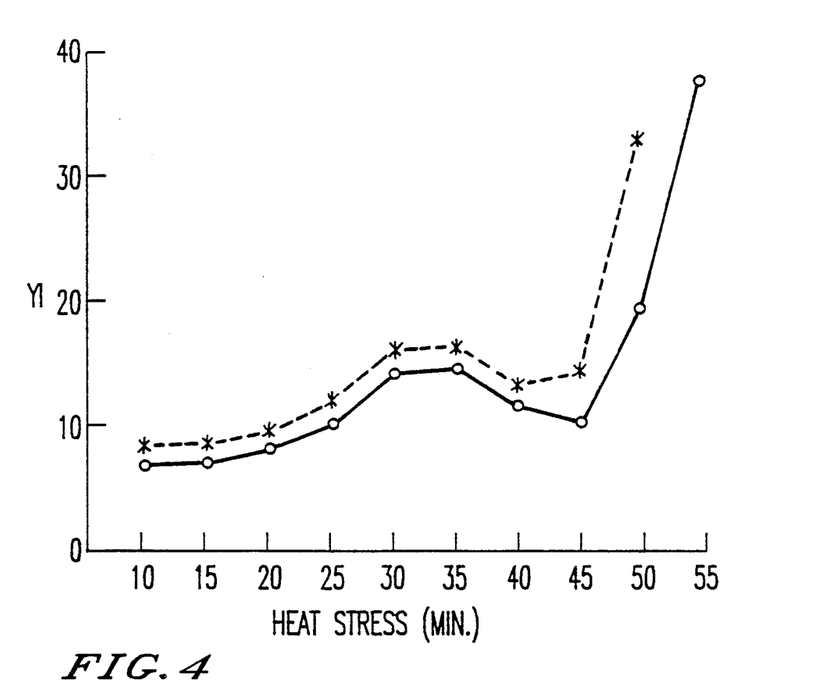
FIG. 4 graphically illustrates the heat-stabilizing effect of various stabilizers in a thermoplastic molding composition by plotting the Yellowness Index (YI) as a function of the time of heat stress, for the stabilizers: Zn/PC/TMP (+) and Zn/PC/TMP/Cop (□)

The results for Zn/PC and Zn/PC/Cop are presented graphically in FIG. 3 and the results for Zn/PC/TMP and Zn/PC/TMP/Cop are presented graphically in FIG. 4.

EXAMPLE 4

Formulation 100 parts by wt. of VESTOLIT S 7054
30 parts by wt. of VESTINOL AH
0.3 part by wt. of zinc stearate
0.6 part by wt. of barium stearate

|  | YI after heat stress (min) | | | | | | | | | | |
|---|---|---|---|---|---|---|---|---|---|---|---|
| Stabilizers | 10 | 15 | 20 | 25 | 30 | 35 | 40 | 45 | 50 | 55 | 60 |
| Zn/PX | 11 | 12 | 13 | 15 | 14 | 13 | 14 | 18 | 32 | 66 | 93 |
| Zn/PX/TMP | 8 | 8 | 9 | 11 | 15 | 15 | 13 | 12 | 20 | 47 | 87 |
| Zn/PX/Cop | 11 | 11 | 13 | 15 | 15 | 14 | 14 | 15 | 21 | 45 | 87 |
| Zn/PX/TMP/Cop | 9 | 9 | 10 | 12 | 16 | 17 | 14 | 13 | 15 | 34 | 69 |

Figure 5:
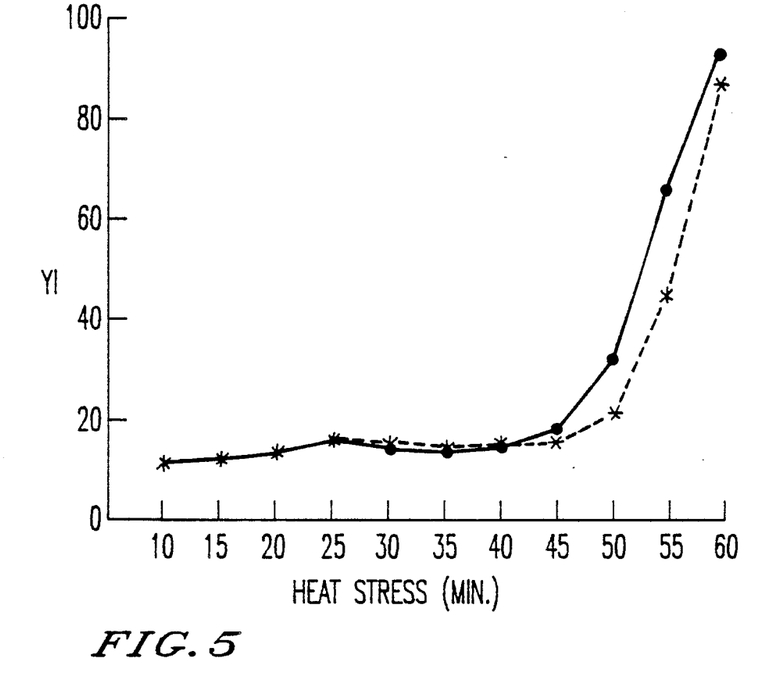
FIG. 5 graphically illustrates the heat-stabilizing effect of various stabilizers in a thermoplastic molding composition by plotting the Yellowness Index (YI) as a function of the time of heat stress, for the stabilizers Zn/PX (·) and Zn/PX/Cop (*)
Figure 6:
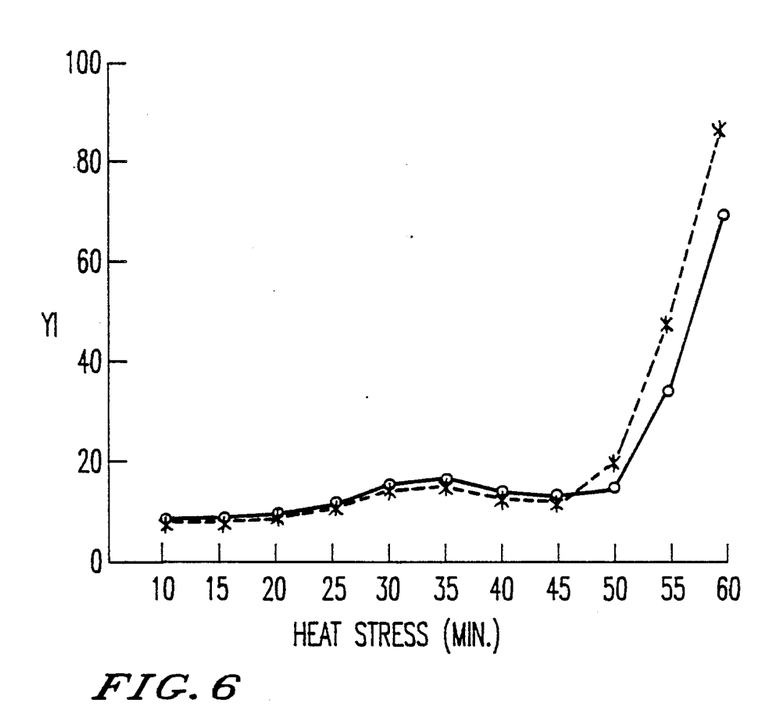
FIG. 6 graphically illustrates the heat-stabilizing effect of various stabilizers in a thermoplastic molding composition by plotting the Yellowness Index (YI) as a function of the time of heat stress, for the stabilizers Zn/PX/TMP (+) and Zn/PX/TMP/Cop (□).

The results for Zn/PX and Zn/PX/Cop are presented graphically in FIG. 5, and the results for Zn/PX/TMP and Zn/PX/TMP/Cop are presented graphically in FIG. 6.

EXAMPLE 5

Formulation 100 parts by wt. of VESTOLIT S 7054
30 parts by wt. of VESTINOL AH
0.3 parts by wt. of montan wax

|  | YI after heat stress (min) | | | | | |
|---|---|---|---|---|---|---|
| Stabilizers | 10 | 15 | 20 | 25 | 30 | 35 |
| Zn/PX | 6 | 6 | 7 | 8 | 9 | 9 |
| Zn/PX/TMP | 5 | 5 | 6 | 7 | 8 | 8 |
| Zn/PX/Cop | 6 | 6 | 7 | 8 | 9 | 9 |
| Zn/PX/TMP/Cop | 5 | 6 | 6 | 6 | 8 | 9 |

Figure 7:
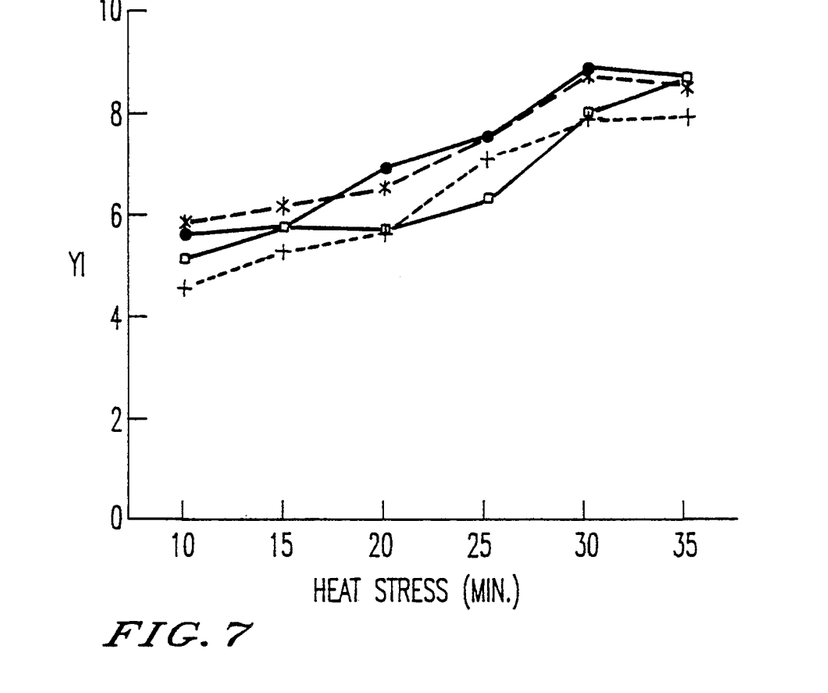

These results are presented graphically in FIG. 7.

EXAMPLE 6

Formulation 100 parts by wt. of VESTOLIT S 7054
30 parts by wt. of VESTINOL AH
0.3 parts by wt. of montan wax

|  | YI after heat stress (min) | | | | | | |
|---|---|---|---|---|---|---|---|
| Stabilizers | 10 | 15 | 20 | 25 | 30 | 35 | 40 |
| Zn/PC | 6 | 6 | 7 | 8 | 7 | 11 | |
| Zn/PC/TMP | 5 | 5 | 6 | 6 | 7 | 9 | 19 |
| Zn/PC/Cop | 6 | 6 | 6 | 7 | 8 | 7 | |
| Zn/PC/TMP/Cop | 5 | 5 | 5 | 6 | 7 | 8 | 11 |

Figure 8:
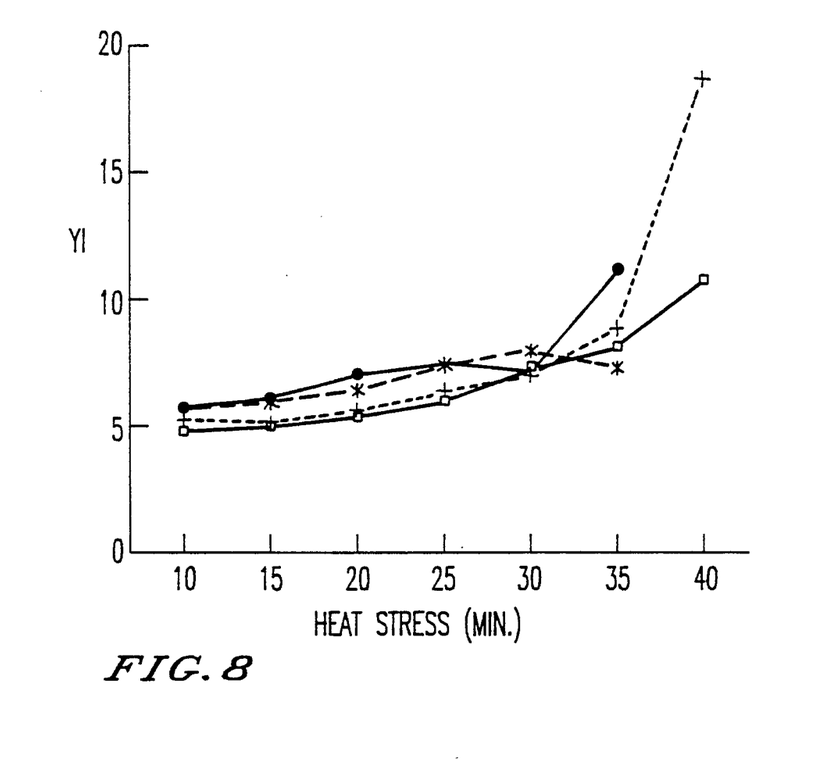

These results are presented graphically in FIG. 8.

EXAMPLE 7

Formulation 100 parts by wt. of VESTOLIT S 6058
1.0 part by wt. of stearic acid

|  | YI after heat stress (min) | | | | | |
|---|---|---|---|---|---|---|
| Stabilizers | 10 | 15 | 20 | 25 | 30 | 35 |
| Zn/PC | 19 | 22 | 25 | 29 | 33 | 59 |
| Zn/PC/TMP | 14 | 16 | 18 | 22 | 33 | 90 |
| Zn/PC/Cop | 19 | 21 | 23 | 27 | 34 | 92 |
| Zn/PC/TMP/Cop | 13 | 14 | 15 | 18 | 25 | 92 |

Figure 9:
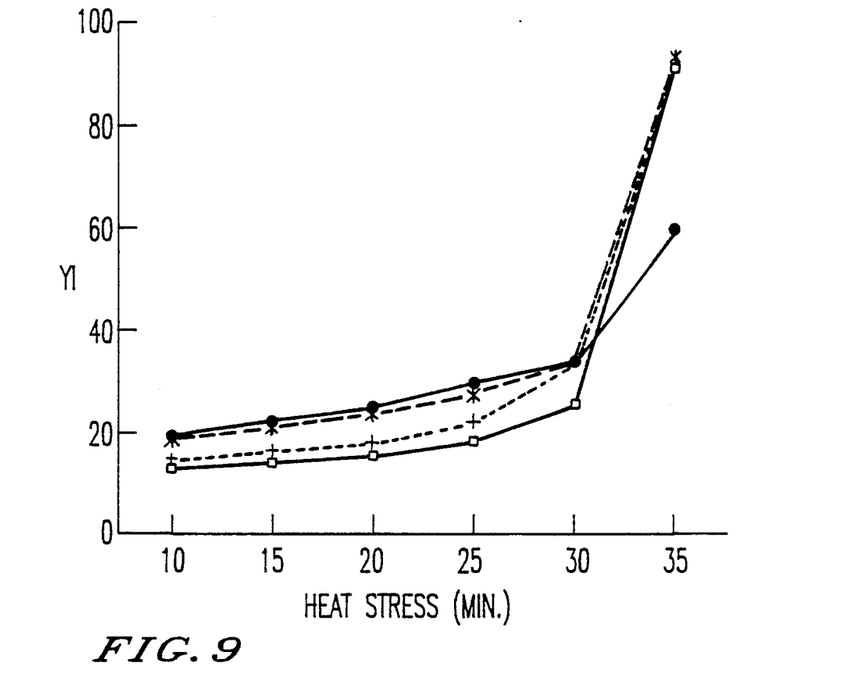

These results are presented graphically in FIG. 9.

EXAMPLE 8

Formulation 100 parts by wt. of VESTOLIT S 6058
1.0 part by wt. of stearic acid

|  | YI after heat stress (min) | | | | | |
|---|---|---|---|---|---|---|
| Stabilizers | 10 | 15 | 20 | 25 | 30 | 35 |
| Zn/PX | 23 | 25 | 29 | 32 | 38 | 65 |
| Zn/PX/TMP | 14 | 17 | 19 | 22 | 26 | 80 |
| Zn/PX/Cop | 20 | 22 | 25 | 29 | 39 | 82 |
| Zn/PX/TMP/Cop | 14 | 16 | 18 | 22 | 27 | 79 |

Figure 10:
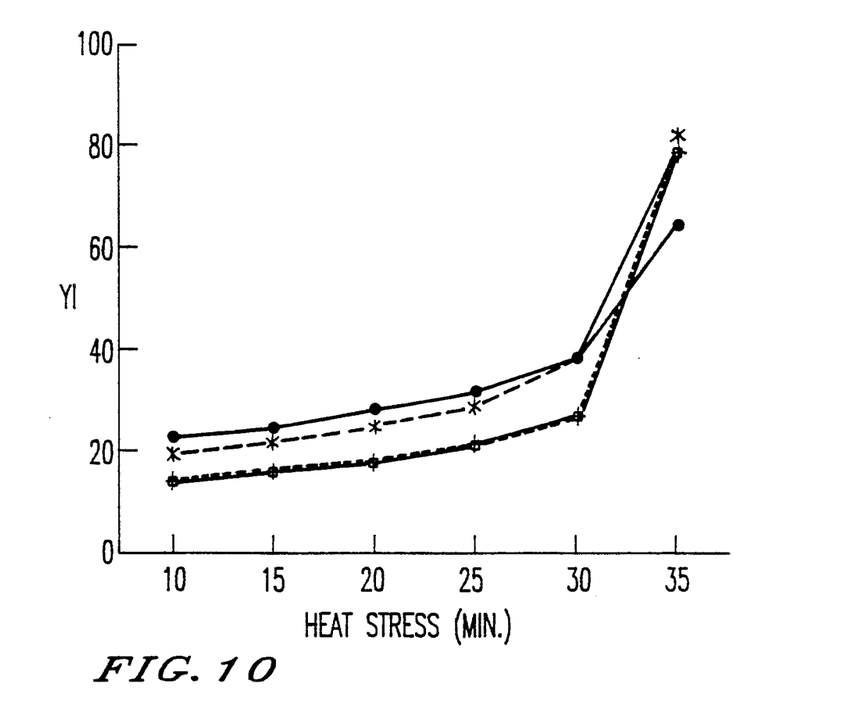

These results are presented graphically in FIG. 10.

EXAMPLE 9

Formulation 100 parts by wt. of VESTOLIT M 5867
5.0 parts by wt. of Reoplast 39

| Stabilizers | YI after heat stress (min) | | | | | | | |
|---|---|---|---|---|---|---|---|---|
| | 10 | 15 | 20 | 25 | 30 | 35 | 40 | 45 |
| Zn/PX | 8 | 8 | 9 | 11 | 14 | 18 | 28 | |
| Zn/PX/TMP | 8 | 8 | 8 | 10 | 12 | 12 | 15 | 23 |
| Zn/PX/Cop | 8 | 9 | 10 | 12 | 15 | 19 | 33 | |
| Zn/PX/TMP/Cop | 7 | 7 | 7 | 9 | 11 | 11 | 14 | 22 |

Figure 11:
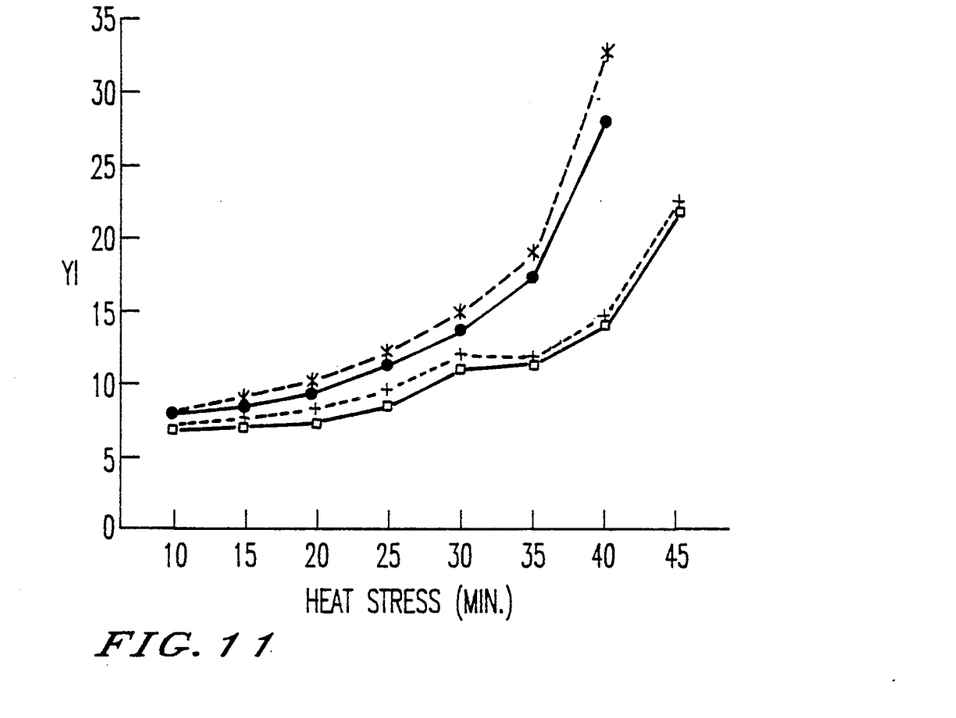

These results are presented graphically in FIG. 11.

EXAMPLE 10

Formulation 100 parts by wt. of VESTOLIT M 5867
5.0 parts by wt. of Reoplast 39

| Stabilizers | YI after heat stress (min) | | | | | | | | | |
|---|---|---|---|---|---|---|---|---|---|---|
| | 10 | 15 | 20 | 25 | 30 | 35 | 40 | 45 | 50 | 55 |
| Zn/PC | 9 | 10 | 11 | 13 | 13 | 20 | 34 | 47 | 59 | 69 |
| Zn/PC/TMP | 8 | 8 | 8 | 9 | 12 | 13 | 16 | 24 | 33 | 45 |
| Zn/PC/Cop | 9 | 10 | 12 | 14 | 17 | 19 | 27 | 49 | 67 | 79 |
| Zn/PC/TMP/Cop | 6 | 7 | 7 | 8 | 10 | 14 | 14 | 20 | 32 | 44 |

Figure 12:
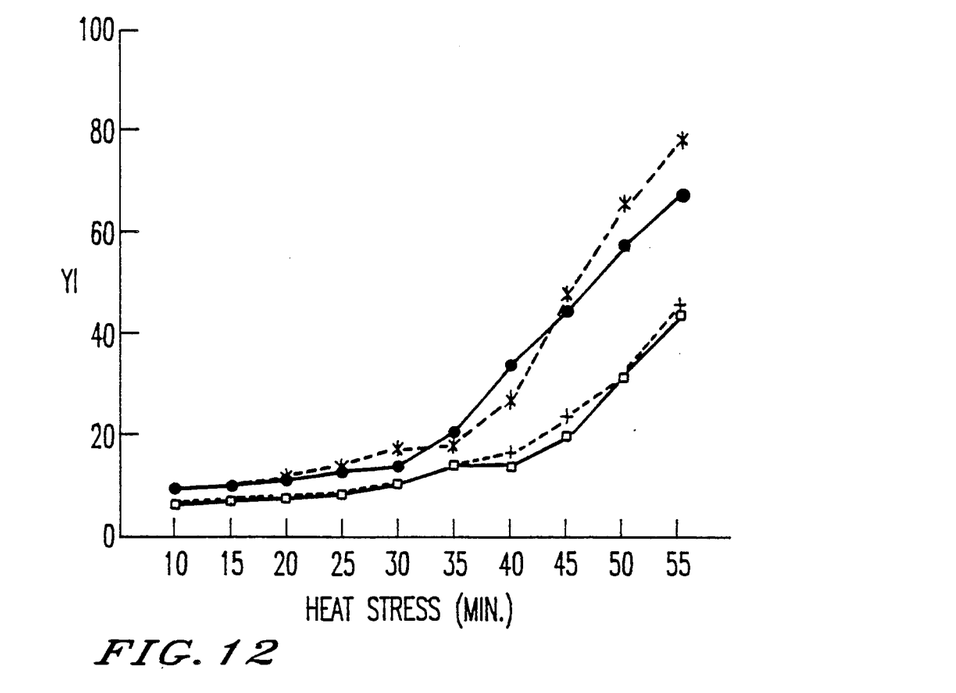

These results are presented graphically in FIG. 12.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A stabilized thermoplastic molding composition, comprising a halogen-containing polymer, a primary stabilizer and costabilizer, wherein said costabilizer is a copolymer I of wherein $R^1$ is a straight-chain or branched alkyl group having from 1 to 20 carbon atoms, a cyclic and/or alkyl-substituted cyclic alkyl group having from 5 to 10 carbon atoms, a straight-chain or branched alkenyl group having from 3 to 18 carbon atoms, an alkyl-, halogen-, or hydroxyl-substituted aryl group, a straight-chain or branched alkoxyl group having from 1 to 20 carbon atoms, a straight-chain or branched alkylcarbonyl group having from 1 to 20 carbon atoms, or a cyano group;

X is a straight-chain or branched alkylene group having from 1 to 20 carbon atoms, a cyclic and/or alkyl-substituted cyclic alkylene group having from 5 to 10 carbon atoms, a straight-chain or branched alkylene group having from 3 to 18 carbon atoms, an alkyl-, halogen-, cyano- or hydroxyl-substituted arylene group, a straight-chain or branched alkyleneoxy group having from 1 to 20 carbon atoms, or a straight-chain or branched alkylenecarbonyl group having from 1 to 20 carbon atoms;

and said primary stabilizer comprises (a) a compound of zinc of the formula (II)

$$R^2O-Zn-OR^3 \quad (II)$$

wherein $R^2$ and $R^3$ are identical or different and represent a straight-chain or branched, optionally hydroxyl-substituted aliphatic acyl group having from 8 to 21 carbon atoms or an aryl group which is optionally substituted by an alkyl group having from 1 to 22 carbon atoms, and (b) at least one polymeric primary stabilizer selected from the group of polyoxazolines of the formula (III)

wherein each occurrence of $R^4$ may independently be a straight-chain or branched alkyl group having from 1 to 22 carbon atoms or a substituted or unsubstituted cycloalkyl or aryl group, and n represents an integer of from 10 to 10,000.

2. The stabilized molding composition of claim 1, wherein said copolymer I is present in an amount of from 0.001 to 2.0 percent by weight and the compounds of the formulae II and III are each present in an amount of from 0.02 to 2.0 percent by weight, based on the weight of the halogen-containing polymer.

3. The stabilized molding composition of claim 1, further comprising an additional primary stabilizer in the form of a compound of tin, lead or antimony or a combination of compounds of cadmium, barium, calcium and zinc and an additional costabilizer selected from the group consisting of phosphites, 1,3-diketones, polyols, alkylated phenols, cyanamides, dicyandiamides, guanamines, indoles, pyrazoles, ureas, thioureas, monophenylureas, diphenylthiourea and aminocrotonic esters.

4. The molding composition of claim 1, wherein $R^4$ is an alkyl group having from 1 to 12 carbon atoms.

5. A stabilizer mixture, comprising an (a) primary stabilizer which comprises an (i) compound of the formula (II)

$$R^2O-Zn-OR^3 \quad (II)$$

wherein $R^2$ and $R^3$ are identical or different and represent a straight-chain or branched, optionally hydroxyl-substituted aliphatic acyl group having from 8 to 21 carbon atoms or an aryl group which is optionally substituted by an alkyl group having from 1 to 22 carbon atoms, and (ii) at least one polymeric primary stabilizer selected from the group of polyoxazolines of the formula (III)

wherein each occurrence of $R^4$ may independently be a straight-chain or branched alkyl group having from 1 to 22 carbon atoms or a substituted or unsubstituted cycloalkyl or aryl group, and n represents an integer of from 10 to 10,000; and
(b) a costabilizer which is a copolymer I of wherein $R^1$ is a straight-chain or branched alkyl group having from 1 to 20 carbon atoms, a cyclic and/or alkyl-substituted cyclic alkyl group having from 5 to 10 carbon atoms, a straight-chain or branched alkenyl group having from 3 to 18 carbon atoms, an alkyl-, halogen- or hydroxyl-substituted aryl group, a straight-chain or branched alkoxy group having from 1 to 20 carbon atoms, a straight-chain or branched alkylcarbonyl group having from 1 to 20 carbon atoms, or a cyano group;

X is a straight-chain or branched alkylene group having from 1 to 20 carbon atoms, a cyclic and/or alkyl-substituted cyclic alkylene group having from 5 to 10 carbon atoms, a straight-chain or branched alkylene group having from 3 to 18 carbon atoms, an alkyl-, halogen-, cyano- or hydroxyl-substituted arylene group, a straight-chain or branched alkyleneoxy group having from 1 to 20 carbon atoms, or a straight-chain or branched alkylenecarbonyl group having from 1 to 20 carbon atoms.

6. The stabilizer mixture of claim 5, wherein $R^4$ is an alkyl group having from 1 to 12 carbon atoms.

* * * * *